United States Patent
Shibusawa et al.

(10) Patent No.: US 11,878,915 B2
(45) Date of Patent: Jan. 23, 2024

(54) PRODUCTION METHOD AND PRODUCTION APPARATUS FOR MOLYBDENUM HEXAFLUORIDE

(71) Applicant: KANTO DENKA KOGYO CO., LTD., Tokyo (JP)

(72) Inventors: Yukinobu Shibusawa, Shibukawa (JP); Hiroki Takizawa, Shibukawa (JP); Kenji Kawahara, Shibukawa (JP); Daichi Hanitani, Shibukawa (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 720 days.

(21) Appl. No.: 17/044,214

(22) PCT Filed: Mar. 29, 2019

(86) PCT No.: PCT/JP2019/013914
§ 371 (c)(1),
(2) Date: Oct. 28, 2020

(87) PCT Pub. No.: WO2019/189715
PCT Pub. Date: Oct. 3, 2019

(65) Prior Publication Data
US 2021/0155498 A1 May 27, 2021

(30) Foreign Application Priority Data
Mar. 30, 2018 (JP) ................. 2018-069232

(51) Int. Cl.
*C01G 39/04* (2006.01)
*B01J 8/02* (2006.01)

(52) U.S. Cl.
CPC ............ *C01G 39/04* (2013.01); *B01J 8/0207* (2013.01); *B01J 8/0278* (2013.01); *B01J 2208/027* (2013.01)

(58) Field of Classification Search
CPC ....... C01G 39/04; B01J 8/0207; B01J 8/0278; B01J 2208/027; B01J 19/24; B01J 2219/00245; B01J 2219/187
See application file for complete search history.

(56) References Cited

U.S. PATENT DOCUMENTS 4,960,581 A 10/1990 Harada et al.
5,578,278 A 11/1996 Fall et al.

FOREIGN PATENT DOCUMENTS

| CN | 1104930 A | 7/1995 | |
|---|---|---|---|
| CN | 103449525 A | 12/2013 | |
| CN | 106219612 A | 12/2016 | |
| JP | H01234301 A | 9/1989 | |
| JP | 2000072442 A | 3/2000 | |
| JP | 2021 127 273 A | * 9/2021 | |
| WO | WO 2019/189715 A1 | * 10/2019 | ............. C01G 39/04 |

OTHER PUBLICATIONS

Chinese Office Action of CN201980022280.7 dated Apr. 22, 2022.
International Search Report of PCT/JP2019/013914, dated Jun. 25, 2019.

* cited by examiner

*Primary Examiner* — Timothy C Vanoy
(74) *Attorney, Agent, or Firm* — BROWDY AND NEIMARK, PLLC

(57) ABSTRACT

The present invention provides a method of producing high-purity molybdenum hexafluoride in good yield and a reaction apparatus therefor. The method of producing molybdenum hexafluoride in a production apparatus for molybdenum hexafluoride, which production apparatus includes a fixed bed that is for mounting metallic molybdenum and that extends inside a reactor from an upstream side to a downstream side of the reactor, a fluorine ($F_2$) gas inlet provided on the upstream side of the reactor, and a reaction product gas outlet provided on the downstream side of the reactor, comprises bringing metallic molybdenum into contact with fluorine ($F_2$) gas, where the fixed bed for mounting metallic molybdenum is tilted.

13 Claims, 2 Drawing Sheets

A: F₂, B: REACTOR, C: CONDENSER, D: TRAP, E: SCRUBBER, F: TRAY

A: F₂, B: REACTOR, C: CONDENSER, D: TRAP, E: SCRUBBER, F: TRAY

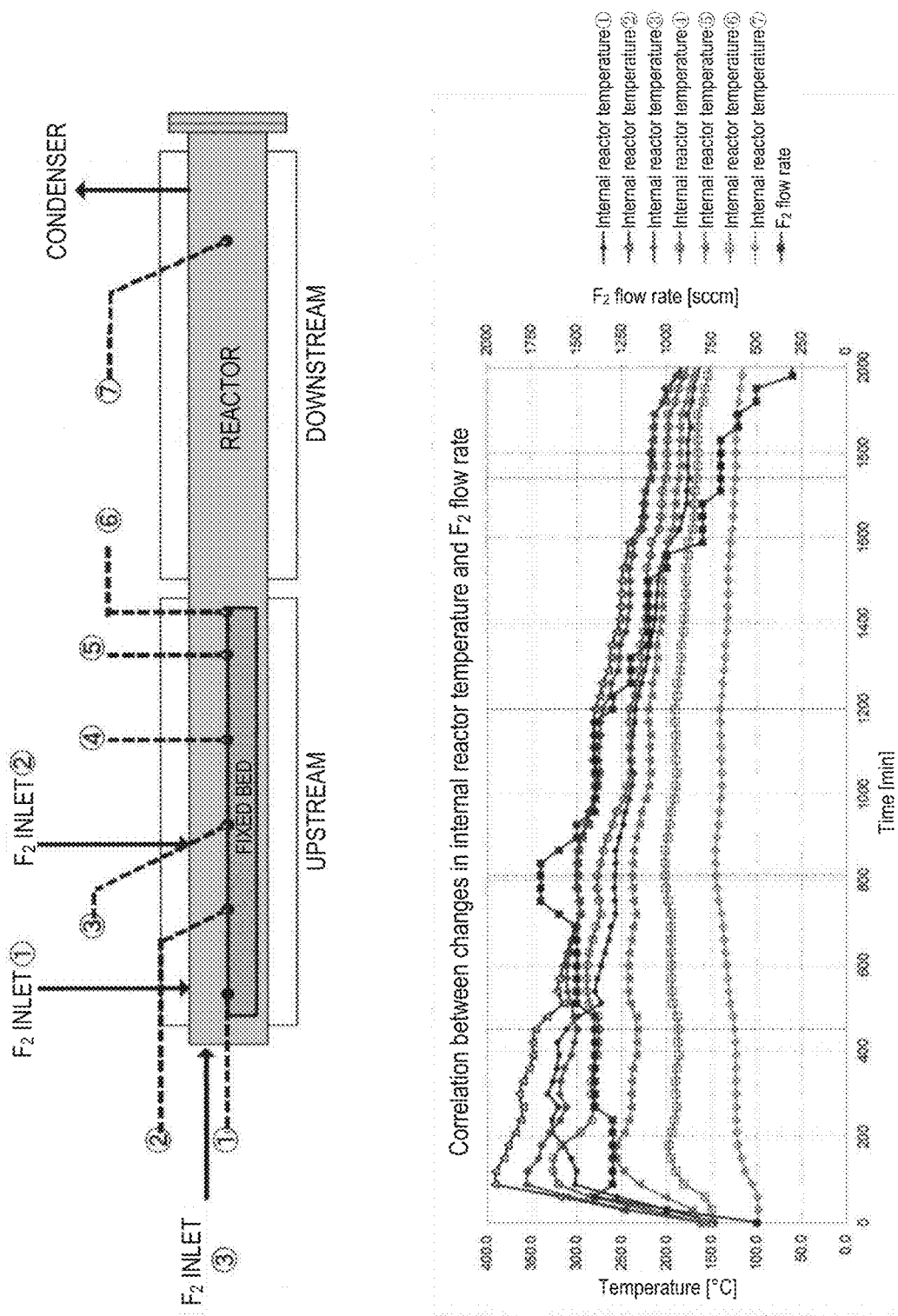

PRODUCTION METHOD AND PRODUCTION APPARATUS FOR MOLYBDENUM HEXAFLUORIDE

TECHNICAL FIELD

The present invention relates to a method of producing high-purity molybdenum hexafluoride in good yield and a reaction apparatus therefor.

BACKGROUND ART

Molybdenum hexafluoride is a promising raw material for a low-resistance high-melting-point interconnection material that contributes to high integration, high speed, low power consumption, and so forth of semiconductor devices. Molybdenum hexafluoride is typically produced by a method of bringing molybdenum elemental metal into contact with fluorine ($F_2$) gas. Fluorine ($F_2$) gas is highly toxic, and unreacted fluorine ($F_2$) gas requires scrubbing treatment. Accordingly, it is needed to efficiently use a certain amount of fluorine ($F_2$) gas in proportion to the amount of the elemental metal raw material in the production of molybdenum hexafluoride.

Fluorides of molybdenum exist in the forms of an increasing number of fluorine atoms one by one from monofluoride (MoF) to hexafluoride ($MoF_6$). In the above-mentioned production method, fluorine ($F_2$) gas should not be reacted in large excess in view of safe handling of fluorine ($F_2$) gas. For this reason, there is a problem in which the product contains unreacted elemental metal as well as intermediates from monofluoride to pentafluoride as impurities. Such impurities not only lower the purity of the hexafluoride product but also cause clogging of the reaction system due to accumulation inside the reaction apparatus or maintenance problems of the reaction apparatus. Meanwhile, since the boiling points of molybdenum pentafluoride (final intermediate) and molybdenum hexafluoride (product) are 214° C. and 35° C. at normal pressure, respectively, it is possible to recover molybdenum hexafluoride as a high-purity gas by providing a condenser at the exit of the reactor, in other words, by utilizing the differences in boiling point.

As a method of efficiently reacting molybdenum elemental metal with fluorine ($F_2$) gas, it has been proposed to incorporate a solid metal fluoride that does not react with fluorine ($F_2$) gas, such as sodium fluoride (NaF) or calcium fluoride ($CaF_2$), into molybdenum elemental metal as a molding aid and to supply the raw material in the form of a molding (Patent Literature (PTL) 1). According to this method, the shape of a molding is maintained during the reaction. Consequently, the problem in which the product recovered as a gas from the reaction system is contaminated with fine powder of the elemental metal is resolved. However, PTL 1 does not mention the problem of residual intermediates. In addition, a work for producing a molding and a work for disposing of the molding after the reaction make the production process complex.

CITATION LIST

Patent Literature

PTL 1: Japanese Unexamined Patent Application Publication No. 1-234301

SUMMARY OF INVENTION

Technical Problem

An object of the present invention is to provide a method of producing high-purity molybdenum hexafluoride in good yield, in which the above-mentioned previously existing problems have been resolved, and to provide a reaction apparatus therefor.

Solution to Problem

The present invention provides the following.

[1] A method of producing molybdenum hexafluoride, in a production apparatus for molybdenum hexafluoride including a fixed bed that is for mounting metallic molybdenum and that extends inside a reactor from an upstream side to a downstream side of the reactor, a fluorine ($F_2$) gas inlet provided on the upstream side of the reactor, and a reaction product gas outlet provided on the downstream side of the reactor, the method comprising bringing metallic molybdenum into contact with fluorine ($F_2$) gas, where the fixed bed for mounting metallic molybdenum is tilted.

[2] The method according to [1] where a tilt angle of the fixed bed is 0.1° to 20°.

[3] The method according to [1] or [2], where a temperature inside the reactor is set to 50° C. to 700° C.

[4] The method according to any of [1] to [3], where fluorine ($F_2$) gas is allowed to flow into the reactor above a tilted surface of the fixed bed.

[5] The method according to any of [1] to [4], where a reaction product gas containing unreacted fluorine ($F_2$) gas and molybdenum hexafluoride gas is passed through a condenser provided at the reaction product gas outlet to separate molybdenum hexafluoride and fluorine ($F_2$) gas from the reaction product gas.

[6] The method according to [5], where a temperature of the condenser is 35° C. to 214° C.

[7] The method according [5], where a temperature of the condenser is 35° C. to 50° C.

[8] A production apparatus for molybdenum hexafluoride comprising: a reactor; a fixed bed that is for mounting metallic molybdenum and that extends inside the reactor from an upstream side to a downstream side of the reactor; a fluorine ($F_2$) gas inlet provided on the upstream side of the reactor; and a reaction product gas outlet provided on the downstream side of the reactor, where the fixed bed is tilted.

[9] The apparatus according to [8], where a tilt angle of the fixed bed is 0.1° to 20°.

[10] The apparatus according to [8] or [9], where the fluorine ($F_2$) gas inlet is provided above a tilted surface of the fixed bed.

[11] The apparatus according to any of [8] to [10], where a condenser for separating molybdenum hexafluoride and fluorine ($F_2$) gas from a reaction product gas is connected to the reaction product gas outlet.

[12] The apparatus according to any of [8] to [11], where a cooled trap for separating molybdenum hexafluoride from unreacted fluorine ($F_2$) gas is connected to the reaction product gas outlet.

[13] The apparatus according to any of [8] to [12], where a material for the reactor is elemental nickel, a nickel alloy, austenitic stainless steel, or a combination thereof.

Advantageous Effects of Invention

According to the present invention, high-purity molybdenum hexafluoride can be produced in good yield. More specifically, it is possible to react without wasting a certain amount of fluorine ($F_2$) gas in proportion to the amount of the elemental metal. Accordingly, the present invention is economically advantageous since unreacted fluorine ($F_2$) gas is less likely to be generated and the amount of fluorine ($F_2$) gas subjected to scrubbing treatment is reduced. Moreover, since the intermediates (MoF, $MoF_2$, $MoF_3$, $MoF_4$, and $MoF_5$) do not remain inside the reaction apparatus without clogging the reaction system, it is also possible to reduce the maintenance costs of the reaction apparatus.

BRIEF DESCRIPTION OF DRAWINGS

FIG. 3 shows changes over time in temperature inside the reactor in Example 1.

DESCRIPTION OF EMBODIMENTS (Action)

Figure 1:
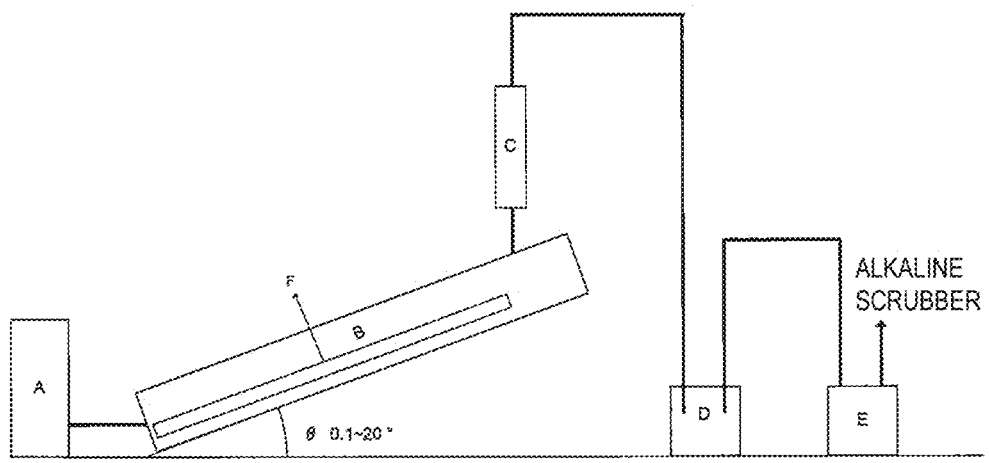
FIG. 1 is a view for illustrating the action and effect of the present invention.

FIG. 1 schematically illustrates a production apparatus for molybdenum hexafluoride of the present invention.

The apparatus of the present invention comprises: a reactor; a fixed bed that is for mounting metallic molybdenum and that extends inside the reactor from an upstream side to a downstream side of the reactor; a fluorine ($F_2$) gas inlet provided on the upstream side of the reactor; and a reaction product gas outlet provided on the downstream side of the reactor. The present invention is characterized in that the fixed bed is tilted. Molybdenum metal as a raw material is converted into the product $MoF_6$ through contact with fluorine ($F_2$) gas via intermediates of MoF, $MoF_2$, $MoF_3$, $MoF_4$, and $MoF_5$. Here, the final intermediate $MoF_5$ has, at normal pressure, a melting point of 67° C. and a boiling point of 214° C. Meanwhile, $MoF_6$ has a melting point of 17° C. and a boiling point of 35° C. Inside the reactor in which the temperature reaches 100° C. or more, MoF, $MoF_2$, $MoF_3$, and $MoF_4$ are solid, whereas $MoF_5$ flows as a liquid or a gas within the reactor. As the fluorination of the raw material proceeds to form $MoF_5$, liquid $MoF_5$ flows on the tilted fixed bed to form a thin liquid layer on the fixed bed surface near the upstream fluorine ($F_2$) inlet. This liquid layer efficiently reacts with fluorine ($F_2$) gas to form $MoF_6$, and $MoF_6$ as a gas flows out the reactor from the reaction product gas outlet. In a part with a relatively high temperature inside the reactor, $MoF_5$ exists as a gas. Since gaseous $MoF_5$ is readily and uniformly mixed with similarly gaseous fluorine ($F_2$), $MoF_6$ is efficiently formed. As just described, the present inventors found that $MoF_6$ is efficiently formed by slightly tilting the fixed bed inside the reactor.

(Production Apparatus for Molybdenum Hexafluoride)

The apparatus of the present invention is as summarized above, and the reactor includes a fixed bed that is for mounting metallic molybdenum and that extends inside the reactor from an upstream side to a downstream side of the reactor, a fluorine ($F_2$) gas inlet provided on the upstream side of the reactor, and a reaction product gas outlet provided on the downstream side of the reactor. Since fluorine ($F_2$) gas is corrosive, materials for the reactor and the fixed bed are commonly elemental nickel, nickel alloys (Inconel. Monel, and Hastelloy, for example), austenitic stainless steel, or combinations thereof.

A tilt angle of the fixed bed is preferably 0.1° to 20°, more preferably 0.1° to 10°, and further preferably 1° to 5°.

A temperature inside the reactor is set to preferably 50° C. to 700° C., more preferably 70° C. to 400° C., and further preferably 100° C. to 200° C. Such adjustment of the reaction temperature can be performed, for example, by circulating cooling water around the reactor.

To allow efficient contact of fluorine ($F_2$) gas with a thin liquid layer of $MoF_5$ as an intermediate, the fluorine ($F_2$) gas inlet is preferably provided above the fixed bed and arranged such that fluorine ($F_2$) gas descends the fixed bed. Further, it is possible to provide a fluorine ($F_2$) gas inlet at the most upstream position of the reactor to generate a constant current from the upstream side to the downstream side of the reactor.

Fluorine ($F_2$) gas introduced into the reactor from the fluorine ($F_2$) gas inlet flows toward the reaction product gas outlet while coming into contact with and reacting with metallic molybdenum on the fixed bed. MoF, $MoF_2$, $MoF_3$, and $MoF_4$ generated through the reaction are solid at the reaction temperature, whereas unreacted fluorine ($F_2$) gas and gases of $MoF_5$ and $MoF_6$ flow out the reactor from the reaction product gas outlet. To enhance reaction efficiency, a carrier gas consisting of an inert gas, such as $N_2$, He, or Ar, may be mixed as necessary by introducing into the reactor from the fluorine ($F_2$) gas inlet toward the reaction product gas outlet. In this case, a carrier gas and fluorine ($F_2$) gas are introduced at a volume ratio of the carrier gas to fluorine ($F_2$) gas of preferably 9:1 to 0:10 and more preferably 1:9 to 0:10. To the reaction product gas outlet, a condenser for separating molybdenum hexafluoride and fluorine ($F_2$) gas from a reaction product gas is connected. As in the foregoing, molybdenum pentafluoride ($MoF_5$) as the final intermediate has a boiling point at normal pressure of 214° C., whereas the molybdenum hexafluoride ($MoF_6$) has a boiling point of 35° C. Accordingly, the temperature of the condenser is 35° C. to 214° C. and preferably 35° C. to 67° C.

Molybdenum hexafluoride and fluorine ($F_2$) gas separated from the reaction product gas are further separated into fluorine ($F_2$) gas (boiling point: −188° C.) through liquefaction of molybdenum hexafluoride. The separated fluorine ($F_2$) gas is recycled by introducing into a second reactor for reaction or is subjected to scrubbing treatment for removal through neutralization using an alkaline scrubber containing an aqueous potassium hydroxide solution or an aqueous sodium hydroxide solution, for example. Alternatively, a dry scrubber may also be used.

(Metallic Molybdenum Raw Material)

As a metallic molybdenum raw material, those used for production of molybdenum hexafluoride in the relevant field may be used without particular limitation. Specifically, those in the form of powder, granule, rod, or the like may be used. When a metallic molybdenum powder is used, it is preferable to use those having a particle size of 1 to 50 μm and a bulk density of 1 to 2, in particular, a particle size of 2 to 4 μm and a bulk density of 1.3 to 1.5 in view of easy handling. When granular metallic molybdenum is used, it is preferable to use those having a maximum diameter of particles of 3 to 10 cm in view of easy handling and reaction efficiency. When rod-shaped metallic molybdenum is used, it is preferable to use those having a dimension in the longitudinal direction of 1 to 5 cm and a dimension in the transverse direction of 1 to 2,000 cm in view of easy handling and reaction efficiency.

EXAMPLES

The present invention will be specifically described by means of the working examples below. However, the scope of the present invention is by no means limited to the following example.

Example 1

Figure 2:
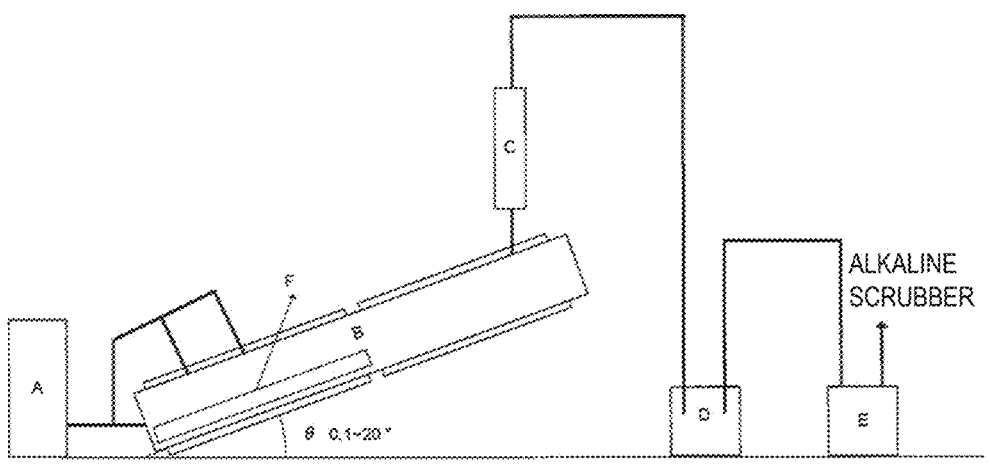
FIG. 2 schematically illustrates the apparatus used in the Example.

FIG. 2 schematically illustrates a production apparatus for molybdenum hexafluoride used in the Example. The apparatus of FIG. 2 includes: a fluorine ($F_2$) tank A for holding fluorine ($F_2$) gas as a fluorinating agent; a reactor B that defines a fluorine ($F_2$) gas channel extending in the longitudinal direction; fluorine ($F_2$) gas supply pipes that connect the fluorine ($F_2$) tank to the reactor; fluorine ($F_2$) gas inlets provided on the upstream side of the reactor (three inlets are provided in FIG. 1); a reaction product gas outlet provided on the downstream side of the reactor (a condenser C is provided at the outlet in FIG. 1); a fixed bed that is for mounting metallic molybdenum and that extends inside the reactor from the upstream side to the downstream side of the reactor: a trap D for molybdenum hexafluoride arranged on the downstream side of the reaction product gas outlet; and a scrubber E (alkaline scrubber, for example) for preventing leakage of fluorine ($F_2$) gas. The fixed bed is formed of a nickel (Ni) boat F. The fixed bed is at an angle of 1° lower on the upstream side than the downstream side. Molybdenum metal as a raw material (particle size: 2 to 4 μm, bulk density: 1.3 to 1.5) was placed within the nickel (Ni) boat.

Molybdenum metal as a raw material is converted into the product MoF through contact with fluorine ($F_2$) gas via intermediates of MoF, $MoF_2$, $MoF_3$, $MoF_4$, and $MoF_5$. Molybdenum metal as a raw material generated heat upon contact with fluorine ($F_2$) gas, but the amount of fluorine ($F_2$) gas introduced was adjusted such that the temperature inside the reactor did not exceed 400° C. A region used for the reaction inside the reactor was maintained at 60° C. or more, and a medium ranging from steam at 160° C. to cold water was allowed to circulate within a jacket around the reactor in response to the amount of heat generated. Inside the reactor in which the temperature reaches 100° C. or more, MoF, $MoF_2$, $MoF_3$, and $MoF_4$ are solid, whereas $MoF_5$ is liquid. As the fluorination of the raw material proceeded to form $MoF_5$, liquid $MoF_5$ flew within the tilted nickel (Ni) boat to form a thin liquid layer on the nickel (Ni) boat surface near the upstream fluorine ($F_2$) inlets. This liquid layer efficiently reacted with fluorine ($F_2$) gas to form $MoF_6$, and $MoF_6$ as a gas flew out the reactor from the reaction product gas outlet. In a part with a relatively high temperature inside the reactor, $MoF_5$ exists as a gas. Since gaseous $MoF_5$ is readily and uniformly mixed with similarly gaseous fluorine ($F_2$), $MoF_6$ was efficiently formed. It was possible to conduct the reaction efficiently without residue inside the reactor after the end of the reaction (90.3% yield). The progress of such an efficient reaction was also read from the changes over time in temperature inside the reactor shown in FIG. 3. Specifically, the temperature inside the reactor suddenly rose to near 400° C. due to the exothermic reaction after staring introduction of fluorine ($F_2$) gas. Subsequently, since the formed intermediates were efficiently fluorinated to $MoF_6$, the reaction temperature was gradually lowered as the raw material and the intermediates were consumed.

Comparative Example 1

Comparative Example 1 was performed in the same manner as Example 1 except for maintaining the nickel (Ni) boat as a fixed bed horizontally (at an angle of 0°). Fluorine ($F_2$) gas was introduced while adjusting the flow rate such that the temperature inside the reactor did not exceed 400° C. However, it was difficult to adjust the temperature by changing the flow rate of fluorine ($F_2$) gas since molybdenum fluoride intermediates failed to react efficiently, thereby making the exothermic reaction uneven. After the end of the reaction, solid and liquid residues were observed inside the reactor (71.1% yield).

The test results are shown in Table 1 below.

TABLE 1

| No. | Reactor | Mo Amount g | Mo Amount mol | $F_2$ Amount g | $F_2$ Amount mol | $F_2$ Equivalent eq. | $F_2$ Flow rate mL/min | Reaction Time h | Reaction Temperature ° C. |
|---|---|---|---|---|---|---|---|---|---|
| Comp. Ex. 1 | Not tilted | 3,031 | 31.6 | 3,810 | 100.3 | 1.1 | 465 to 1,767 | 35 | 139 to 400 |
| Ex. 1 | Titled | 2,994 | 31.2 | 3,890 | 102.4 | 1.1 | 93 to 1,582 | 38.7 | 145 to 400 |

| No. | Jacket Temperature ° C. | Condenser Temperature ° C. | Amount trapped g | Intermediates Visual observation g | Yield % | Purity % |
|---|---|---|---|---|---|---|
| Comp. Ex. 1 | 160 Steam | 80 | 4,720 | Present | 71.1 | 99.8235 |
| Ex. 1 | 160 Steam | 80 | 5,920 | Absent | 90.3 | 99.9347 |

In comparison between Example 1 and Comparative Example 1, Example 1 in which the fixed bed inside the reactor was tilted at only 1° exhibits a high yield of 90.3% and a high purity of the product $MoF_6$ of 99.9% without residual intermediates (MoF, $MoF_2$, $MoF_3$, $MoF_4$, and $MoF_5$) observed inside the reactor after the end of the reaction. In contrast, Comparative Example 1 in which the fixed bed inside the reactor was maintained horizontally exhibits a high purity of the product $MoF_6$ of 99.8%, but a low yield of 71.1%, and residual intermediates (MoF, $MoF_2$, $MoF_3$, $MoF_4$, and $MoF_5$) inside the reactor after the end of the reaction. As in the foregoing, the present inventors found that high-purity $MoF_6$ can be produced efficiently according to the present invention by slightly tilting the fixed bed inside the reactor and by providing a condenser at the product exit. Furthermore, it was also found that reaction intermediates do not remain inside the reactor after the end of the reaction and the maintenance of the apparatus is easy according to the present invention.

The invention claimed is:

1. A method of producing molybdenum hexafluoride, in a production apparatus for molybdenum hexafluoride including a fixed bed that is for mounting metallic molybdenum and that extends inside a reactor from an upstream side to a downstream side of the reactor, a fluorine ($F_2$) gas inlet provided on the upstream side of the reactor, and a reaction product gas outlet provided on the downstream side of the reactor, the method comprising bringing metallic molybdenum into contact with fluorine ($F_2$) gas, wherein the fixed bed for mounting metallic molybdenum is tilted.

2. The method according to claim 1, wherein a tilt angle of the fixed bed is 0.1° to 20°.

3. The method according to claim 1, wherein a temperature inside the reactor is set to 50° C. to 700° C.

4. The method according to claim 1, wherein fluorine ($F_2$) gas is allowed to flow into the reactor above a tilted surface of the fixed bed.

5. The method according to claim 1, wherein a reaction product gas containing unreacted fluorine ($F_2$) gas and molybdenum hexafluoride gas is passed through a condenser provided at the reaction product gas outlet to separate molybdenum hexafluoride and fluorine ($F_2$) gas from the reaction product gas.

6. The method according to claim 5, wherein a temperature of the condenser is 35° C. to 214° C.

7. The method according to claim 5, wherein a temperature of the condenser is 35° C. to 50° C.

8. A production apparatus for molybdenum hexafluoride comprising: a reactor; a fixed bed that is for mounting metallic molybdenum and that extends inside the reactor from an upstream side to a downstream side of the reactor; a fluorine ($F_2$) gas inlet provided on the upstream side of the reactor; and a reaction product gas outlet provided on the downstream side of the reactor, wherein the fixed bed is tilted.

9. The apparatus according to claim 8, wherein a tilt angle of the fixed bed is 0.1° to 20°.

10. The apparatus according to claim 8, wherein the fluorine ($F_2$) gas inlet is provided above a tilted surface of the fixed bed.

11. The apparatus according to claim 8, wherein a condenser for separating molybdenum hexafluoride and fluorine ($F_2$) gas from a reaction product gas is connected to the reaction product gas outlet.

12. The apparatus according to claim 8, wherein a cooled trap for separating molybdenum hexafluoride from unreacted fluorine ($F_2$) gas is connected to the reaction product gas outlet.

13. The apparatus according to claim 8, wherein a material for the reactor is elemental nickel, a nickel alloy, austenitic stainless steel, or a combination thereof.

* * * * *